(12) United States Patent
Kimura et al.

(10) Patent No.: US 8,553,492 B2
(45) Date of Patent: Oct. 8, 2013

(54) SEISMIC SOURCE CONTROLLER AND DISPLAY SYSTEM

(71) Applicant: Schlumberger Technology Corporation, Sugar Land, TX (US)

(72) Inventors: Tsunehisa Kimura, Sugar Land, TX (US); Emmanuel Coste, Oslo (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 13/649,121

(22) Filed: Oct. 11, 2012

(65) Prior Publication Data

US 2013/0044566 A1    Feb. 21, 2013

Related U.S. Application Data

(62) Division of application No. 10/965,045, filed on Oct. 14, 2004, now abandoned.

(51) Int. Cl.
*G01V 1/00* (2006.01)

(52) U.S. Cl.
CPC . *G01V 1/00* (2013.01); *G01V 1/003* (2013.01)
USPC .......................................................... 367/25

(58) Field of Classification Search
USPC .......... 367/13–15, 23, 25, 137, 144; 181/103, 181/106, 108, 113
See application file for complete search history.

(56) References Cited

U.S. PATENT DOCUMENTS

| | | |
|---|---|---|
| 4,210,897 A | 7/1980 | Hutchins |
| 4,300,653 A | 11/1981 | Cao et al. |
| 4,476,553 A | 10/1984 | Ziolkowski et al. |
| 4,660,184 A | 4/1987 | Haukjem et al. |
| 4,674,068 A | 6/1987 | Carruth, Jr. |
| 4,721,180 A | 1/1988 | Haughland et al. |

(Continued)

FOREIGN PATENT DOCUMENTS

| | | |
|---|---|---|
| EP | 0400769 | 12/1990 |
| FR | 2588968 | 4/1987 |

(Continued)

OTHER PUBLICATIONS

Brice, Larsen, Morice, Svendsen and Ozbek, "Perturbations in 4D Marine Seismic," Preview: Australian Society of Exploration Geophysicists, Feb. 1996.

(Continued)

*Primary Examiner* — Krystine Breier
(74) *Attorney, Agent, or Firm* — Jianguang Du; Jody DeStefanis

(57) ABSTRACT

A seismic survey system for performing offset borehole seismic survey measurement operations. The system may include a first seismic survey subsystem having a first wireless digital communication device and a second seismic survey subsystem having a second wireless digital communication device and remotely located from the first seismic survey subsystem. The first and second digital communication devices may be configured to provide a digital communication link for transporting digital information between the first seismic survey subsystem and second seismic survey subsystem. The system may be configured to enable a user at the first seismic survey subsystem to remotely modify at least a portion of a first plurality of operating parameters associated with at least one source signal device located at the second seismic survey subsystem. The system may also be configured to utilize GPS information in order to improve accuracy of source signal firing timing synchronization.

20 Claims, 14 Drawing Sheets

(56) References Cited

U.S. PATENT DOCUMENTS

| | | | |
|---|---|---|---|
| 4,757,482 | A | 7/1988 | Fiske, Jr. |
| H656 | H | 7/1989 | Huizer et al. |
| 4,868,794 | A | 9/1989 | Ziolkowski et al. |
| 4,893,285 | A | 1/1990 | Masson et al. |
| 4,894,807 | A * | 1/1990 | Alam et al. ............ 367/15 |
| 4,895,807 | A * | 1/1990 | Cherksey ............ 436/63 |
| 5,184,329 | A | 2/1993 | Regnault et al. |
| 5,200,927 | A | 4/1993 | Cretin et al. |
| 5,524,709 | A | 6/1996 | Withers |
| 5,548,562 | A | 8/1996 | Helgerud et al. |
| 5,555,220 | A | 9/1996 | Minto |
| 5,581,415 | A | 12/1996 | de Graffenried |
| 5,600,318 | A | 2/1997 | Li |
| 5,724,241 | A | 3/1998 | Wood et al. |
| 5,724,308 | A | 3/1998 | Sorrells et al. |
| 5,822,273 | A | 10/1998 | Bary et al. |
| 5,920,828 | A | 7/1999 | Norris et al. |
| 5,940,778 | A | 8/1999 | Marfurt et al. |
| 5,978,313 | A | 11/1999 | Longaker |
| 5,995,905 | A | 11/1999 | Ikelle et al. |
| 6,002,339 | A | 12/1999 | Norris |
| 6,026,056 | A | 2/2000 | Lunde et al. |
| 6,044,038 | A | 3/2000 | Allensworth |
| 6,091,668 | A | 7/2000 | Barber, Sr. |
| 6,188,962 | B1 | 2/2001 | Morgan et al. |
| 6,301,193 | B1 | 10/2001 | Martin et al. |
| 6,464,011 | B2 * | 10/2002 | Tubel ............ 166/313 |
| 6,630,890 | B1 | 10/2003 | Endo et al. |
| 6,788,618 | B2 * | 9/2004 | Clayton et al. ............ 367/13 |
| 6,873,571 | B2 | 3/2005 | Clayton et al. |
| 7,359,282 | B2 | 4/2008 | Tulett |
| 7,974,150 | B2 | 7/2011 | Tulett et al. |
| 2001/0030076 | A1 | 10/2001 | Paulsson |
| 2002/0132594 | A1 | 9/2002 | Douma |
| 2003/0117893 | A1 | 6/2003 | Bary |
| 2003/0192692 | A1 | 10/2003 | Tubel |
| 2003/0202423 | A1 | 10/2003 | Clayton et al. |
| 2004/0006430 | A1 | 1/2004 | Harmon et al. |
| 2004/0136266 | A1 | 7/2004 | Howlid et al. |
| 2004/0228214 | A1 | 11/2004 | Tulett |

FOREIGN PATENT DOCUMENTS

| | | |
|---|---|---|
| GB | 2029016 | 3/1980 |
| GB | 2172997 | 10/1986 |
| GB | 2320327 | 6/1998 |
| GB | 2379741 | 3/2003 |
| JP | 11-063984 | 3/1999 |
| WO | 01/71385 | 9/2001 |
| WO | 01/75481 | 10/2001 |
| WO | 03/067201 | 8/2003 |
| WO | 03/067283 | 8/2003 |
| WO | 2004/102223 | 11/2004 |
| WO | 2006/040642 | 4/2006 |
| WO | 2007/056278 | 5/2007 |

OTHER PUBLICATIONS

Definition of "synchronize" from dictionary.com, downloaded Dec. 5, 2011 as http://dictionary.reference.com/browse/synchronize.

J-F. Hopperstad, P. Vermeer, "An azimuth-invariant source array", SEG Int'l Exposition and Annual Meeting, San Antonio, Texas, Sep. 9-14, 2001.

Proxim Wireless, "Technology Overview." 2002.

OA for the equivalent U.S. Appl. No. 12/048,201 issued on Jul. 18, 2013.

* cited by examiner

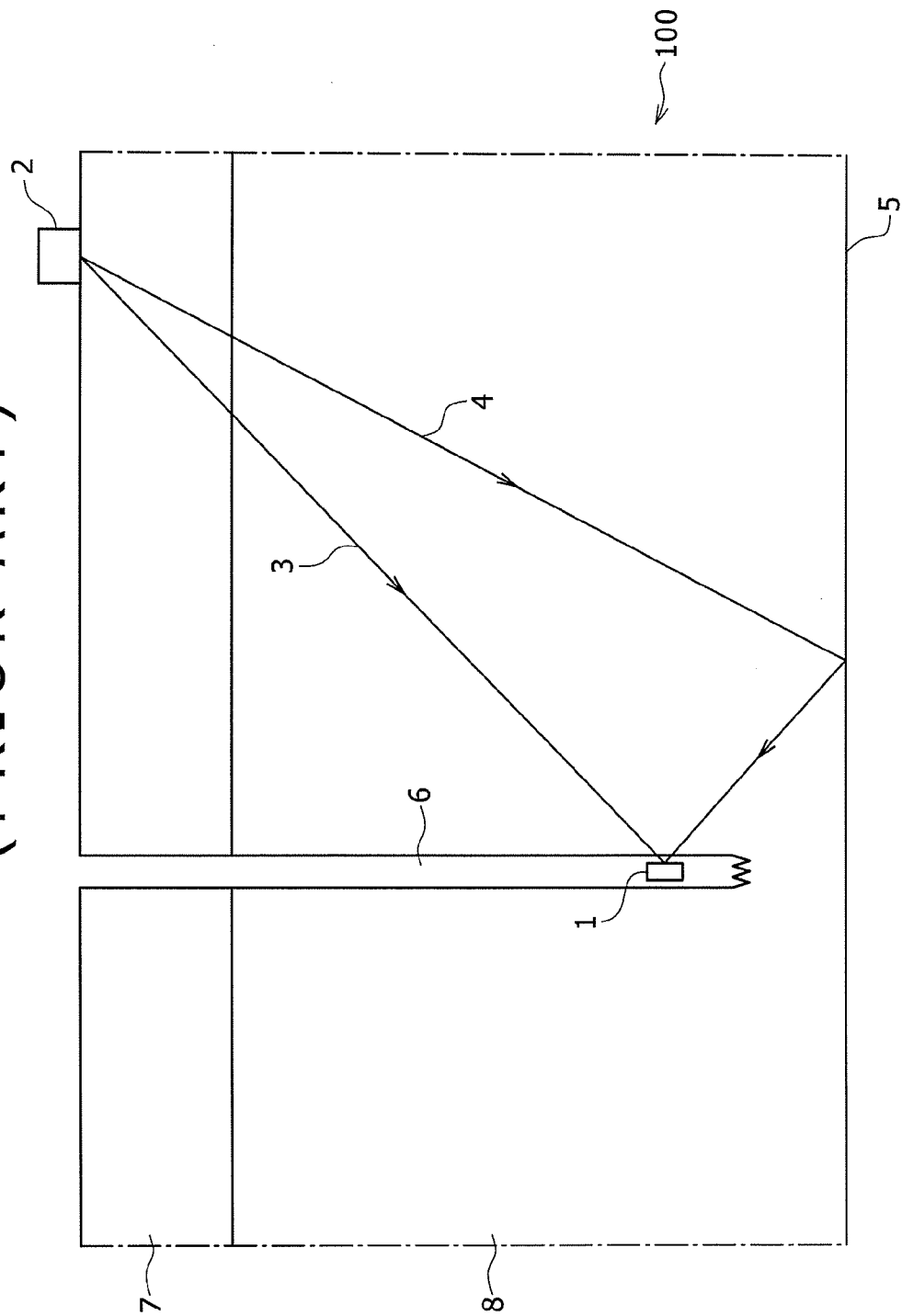

SEISMIC SOURCE CONTROLLER AND DISPLAY SYSTEM

This is a divisional of U.S. patent application Ser. No. 10/965,045 filed 14 Oct. 2004.

BACKGROUND OF THE INVENTION

1. Field of the Invention

The present invention relates generally to methods and apparatus for exploring subsurface formations. More particularly, the present invention relates to improved techniques for controlling seismic exploration testing and measurement equipment.

2. Background

Geophysical mapping techniques for determining subsurface structures in the Earth include, for example, seismic surveying, magnetotelluric surveying and controlled source electromagnetic surveying, among others. Generally, a variety of different seismic surveying techniques may be used in performing seismic exploration of different physical environments such as land environments and marine environments. Such seismic surveying techniques may include, for example, surface seismic exploration and borehole seismic exploration.

In surface seismic surveying, an array of seismic sensors is deployed at the Earth's surface (or near the water surface or on the water bottom for various types of marine seismic surveying), and one or more seismic energy sources is actuated at or near the Earth's surface in a location near the seismic sensor array. A record is made, indexed with respect to time of actuation of the seismic energy source, of signals corresponding to seismic energy detected by each of the sensors in the array. Seismic energy travels downwardly from the source and is reflected from acoustic impedance boundaries below the Earth's surface. The reflected energy is detected by the sensors. Various techniques are known in the art for determining the structure of the subsurface Earth formations below and/or adjacent to the sensor array from recordings of the signals corresponding to the reflected seismic energy. Other techniques known in the art provide estimates of fluid content in porous Earth formations from characteristics of the reflected energy such as its phase and/or amplitude.

Borehole seismic surveys are typically conducted by placing receivers in a borehole and operating a seismic source at the surface to generate an acoustic wave. Typically the receivers are placed in a shuttle and deployed downhole for the duration of the survey and then removed.

Seismic data are typically collected using an array of seismic sources and seismic receivers. The data may be collected on land using, for example, vibration devices or explosive charges as sources and geophones as receivers; or the data may be collected at sea using, for example, air guns as the sources and hydrophones as the receivers.

FIG. 1A is a schematic illustration of the survey geometry for the method of seismic surveying known as vertical seismic profiling (VSP) surveying. In this surveying geometry, the receiver 1 is not disposed on the earth's surface, but is disposed within the earth, in this example within a borehole 6. The seismic source 2 is disposed on the earth's surface. Two ray paths for seismic energy are shown in FIG. 1. Path 3 is a path in which the seismic energy does not undergo reflection, although it is refracted at the boundary between two layers 7, 8 of the earth. Since seismic energy that travels along this path travels direct from the source 2 to the receiver 1 without reflection, this path is known as the "direct path". Path 4 is a path in which seismic energy emitted by the source 2 is incident on the receiver 1 after reflection by a reflector 5 located at a greater depth than the receiver, and is thus known as a "reflection path".

In FIG. 1A the seismic source 2 is located at a distance from the point at which the vertical line on which the receiver 1 is disposed passes through the earth's surface. This geometry is known as offset VSP, since there is a non-zero horizontal distance between the seismic source and the receiver. The horizontal distance between the seismic source and the receiver is generally known as "offset". In an alternative VSP geometry, the seismic source is located nearly vertically over the receiver, and this is known as zero-offset VSP.

FIG. 1A shows only one seismic source and one receiver, but it is possible for there to be more than one source and/or more than one receiver. In the survey geometry known as multi-offset VSP, a plurality of seismic sources are located on the surface of the earth, with each source having a different offset (i.e., being at a different horizontal distance from the point at which the vertical line on which the receiver 1 is disposed passes through the earth's surface).

A vertical seismic profile (VSP) is a class of borehole seismic measurements used for correlation between surface seismic receivers and wireline logging data. VSPs can be used to tie surface seismic data to well data, providing a useful tie to measured depths. Typically VSPs yield higher resolution data than surface seismic profiles provide. VSPs enable converting seismic data to zero-phase data as well as enable distinguishing primary reflections from multiples. In addition, a VSP is often used for analysis of portions of a formation ahead of the drill bit.

Conventionally, there are a variety of different VSP configurations including zero-offset VSP, offset VSP, walkaway VSP, vertical incidence VSP, salt-proximity VSP, multi-offset VSP, and drill-noise or seismic-while-drilling VSP. Check-shot surveys are similar to VSP in that acoustic receivers are placed in the borehole and a surface source is used to generate an acoustic signal. However, a VSP is a more detailed than a check-shot survey. The VSP receivers are typically more closely spaced than those in a check-shot survey; check-shot surveys may include measurement intervals hundreds of meters apart. Further, a VSP uses the reflected energy contained in the recorded trace at each receiver position as well as the first direct path from source to receiver while the check-shot survey uses only the direct path travel time.

While VSPs can provide valuable information about a formation, source perturbations (e.g. shot to shot variations in the seismic signature of an air gun) introduce error into the raw seismic data which percolates through the processing chain to the final images produced. VSP source perturbations can limit the full range of usefulness that VSPs data can provide. In marine surface seismic acquisitions, these source perturbations can be well controlled through digital gun controllers and processes such as source signal estimation (see, for example, U.S. Pat. Nos. 4,757,482; 5,581,415; 5,995,905; and 4,476,553, which are hereby incorporated by reference in their entirety for all purposes).

FIG. 1B shows an example of a borehole offset VSP measurement scenario in a marine environment in which an offshore rig 100 is positioned over a subsea borehole 102. The borehole 102 includes a plurality of spaced receivers 103 to facilitate, for example, a vertical seismic profile VSP acquisition. When performing borehole offset VSP measurements in a marine environment, a boat 122 is typically used to transport the seismic signal source equipment to a desired location away from the offshore rig 100.

In the example of FIG. 1B, the seismic signal source equipment which is located at the boat includes an air-gun or guns 106 suspended below the surface by a float 108. An analog hydrophone 110 is suspended below the air-gun 106. The hydrophone 110 can provide partial information for correcting time break errors attributable to time differences for swells, irregular source firings, etc. One or more analog lines form part of an umbilical 111 that may also include an air line. The umbilical 111 provides an analog communications/control link between the boat-side seismic survey computer system 124 and the signal source equipment.

Typically, the rig-side seismic survey computer system 120 and the boat-side seismic survey computer system 124 are initially configured with desired operating parameters before deployment in the field. Once the computer systems have been deployed in the field, a human technician is stationed at each system to operate their respective equipment in order to carry out seismic survey measurements. Communication between the rig-side seismic survey computer system and the boat-side seismic survey computer system is typically implemented using an analog radio communication link.

Conventionally, rig-side seismic survey computer systems and boat-side seismic survey computer systems do not include functionality for enabling remote configuration or modification of their operating parameters. Thus, for example, when the rig-side technician (stationed at the rig-side seismic survey computer system) desires to modify an operating parameter at the boat-side seismic survey computer system, the rig-side technician is required to communicate (typically via radio communication) with the boat-side technician in order to instruct the boat-side technician to modify the desired parameter(s) at the boat-side seismic survey computer system. The boat-side technician is then responsible for implementing the specified parameter modifications at the boat-side seismic survey computer system.

Moreover, due to the complexity of seismic source control operations, conventional source control systems provide only limited quality control (QC) features, and provide only limited functionality for controlling source control equipment, especially for remote source signal and large source arrays. Accordingly, it will be appreciated that there exists a need for improving seismic survey measurement techniques and equipment.

SUMMARY OF THE INVENTION

One aspect of the present invention is directed to various methods, systems and computer program products for using a first seismic survey system to remotely control desired aspects of a second, remote seismic survey system. The second seismic survey system includes a first seismic source signal device which has a first plurality of operating parameters associated therewith. A source signal device parameter interface is displayed at the first seismic survey system. In at least one implementation, the source signal device parameter interface is designed to facilitate remote modification of at least a portion of the first plurality of operating parameters associated with the first source signal device. Selected operating parameter values associated with the first source signal device may be modified at the first seismic survey system, using the source signal device parameter interface. The modified operating parameter values may then be transmitted from the first seismic survey system to the second seismic survey system. The second seismic survey system may then automatically implement modification of the selected operating parameter values associated with the first source signal device using the received modified selected operating parameter values.

Another aspect of the present invention is directed to various methods, systems and computer program products for performing offset borehole seismic survey measurement operations using a first seismic survey system and a second seismic survey system. The second seismic survey system includes a first seismic source signal device having a first plurality of operating parameters associated therewith. A first seismic survey measurement operation is performed. According to a specific embodiment, the first seismic survey measurement operation generates a first portion of quality control information. The first portion of quality control information may then be analyzed at the first seismic survey system. Modified operating parameter information may then be generated in response to the analysis of the first portion of quality control information. According to a specific embodiment, the modified operating parameter information relates to at least one operating parameter associated with the first source signal device. The modified operating parameter information may then be used to remotely modify, using at least one interface at the first seismic survey system, at least one operating parameter associated with the first source signal device.

Yet another aspect of the present invention is directed to a seismic survey system for performing offset borehole seismic survey measurement operations. According to a specific embodiment, the system may include a first seismic survey subsystem and a second seismic survey subsystem remotely located from the first seismic survey subsystem. The first seismic survey subsystem may include a first source control system; a first interface; a first wireline tool control system; and a first wireless digital communication device. The second seismic survey subsystem may include a second source control system; a second interface; at least one source signal device; and a second wireless digital communication device. According to a specific implementation, the first and second digital communication devices may be configured to provide a digital communication link for transporting digital information between the first seismic survey subsystem and second seismic survey subsystem. In at least one implementation the system may be configured to enable a user at the first seismic survey subsystem to remotely modify at least a portion of the first plurality of operating parameters associated with at least one source signal device located at the second seismic survey subsystem. Additionally, according to a specific embodiment, the seismic survey system of the present invention may be configured to utilize GPS information in order to improve accuracy of source signal firing timing synchronization.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 1A is a schematic illustration of the survey geometry for the method of seismic surveying known as vertical seismic profiling (VSP) surveying.

DETAILED DESCRIPTION OF THE PREFERRED EMBODIMENTS

As described in greater detail below, the technique of the present invention provides a variety of novel features which may be used for improving seismic survey measurement techniques.

According to at least one embodiment of the present invention, a new digital seismic source controller graphical user interface (GUI) may be implemented at the rig-side seismic survey computer system, remote-side (e.g., boat-side) seismic survey computer system, and/or other seismic survey computer systems. In at least one implementation, the seismic source controller GUI may include a plurality of different windows, each of which provides functionality for improved source control functionality. Such windows may include, for example: (1) a Main Window which provides for radio modem communication parameter control, Ethernet communication parameter control, master/slave connection control, database control, access to other sub windows, etc.; (2) a Fire Control Window which provides functionality for fire control configuration, source enable/disable control, system health check & sensor calibration, system mode selection, sensor reading monitor, sub system booting, etc.; (3) a Quality Control Window which provides function only for presenting QC plots such as, for example, source signature plots, source signature frequency plots, source tuning plots, source solenoid current plots, overlaid plots, tuning error history plots, source delay history plots, source depth plots, source pressure plots, etc.; (4) an Error Report Window which provides function only for displaying error messages relating to one or more of the seismic survey computer systems; (5) a System Configuration Window which provides functionality for local and/or remote configuration and/or modification of fire control parameters, source control setup and operating parameters, and configuration element setup and operating parameters, etc.

One of the unique features of the present invention is its ability to allow each source control system to be independently configured as a master or slave. In at least one implementation, a master system may be provided with the capability of partial remote control of the slave system and slave system operating parameters, including, for example, parameter modification, test firing, slave system assignment and selection, etc. In at least one embodiment, a master system may be configured or designed to control a plurality of slave systems.

Figure 1B:
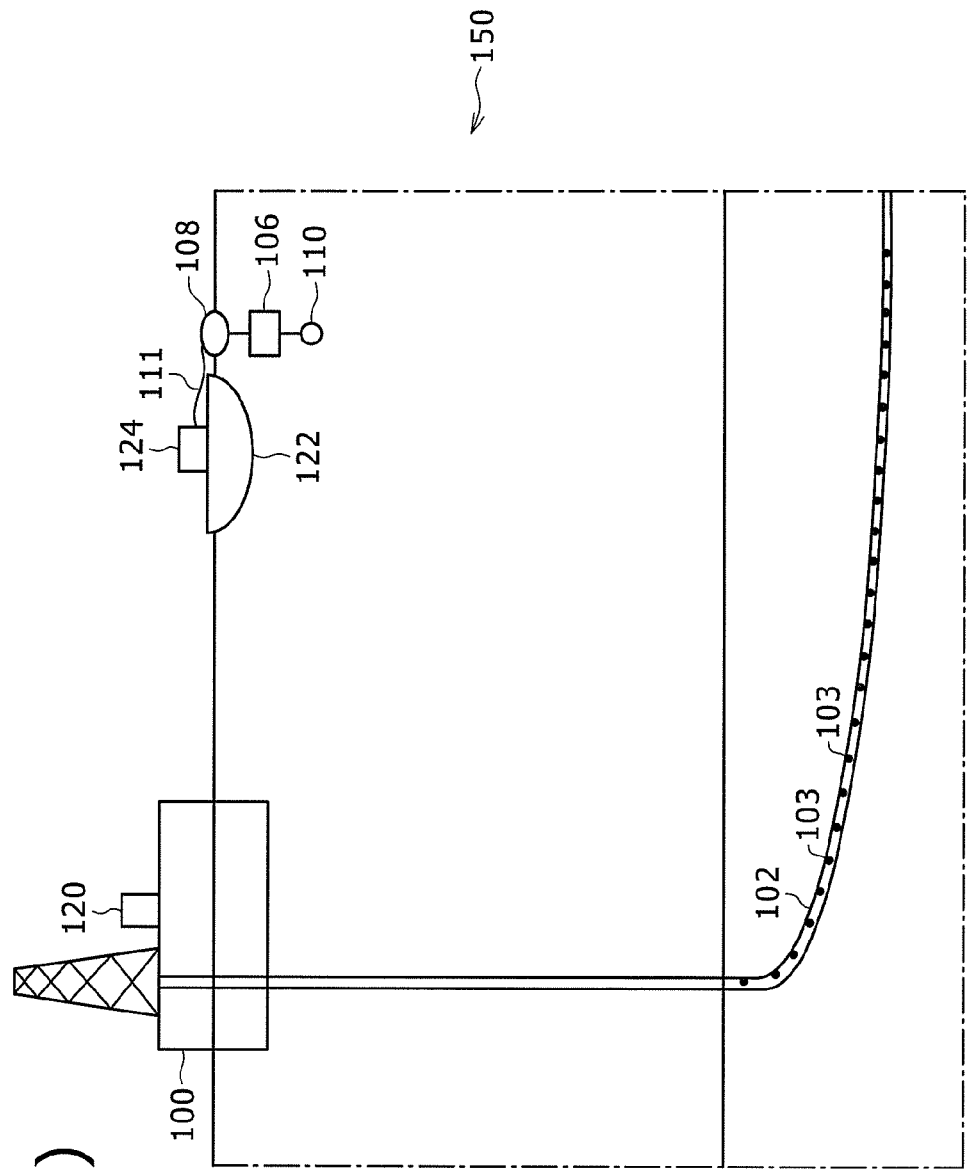
FIG. 1B shows an example of a borehole offset VSP measurement scenario in a marine environment in which an offshore rig 100 is positioned over a subsea borehole 102.
Figure 2:
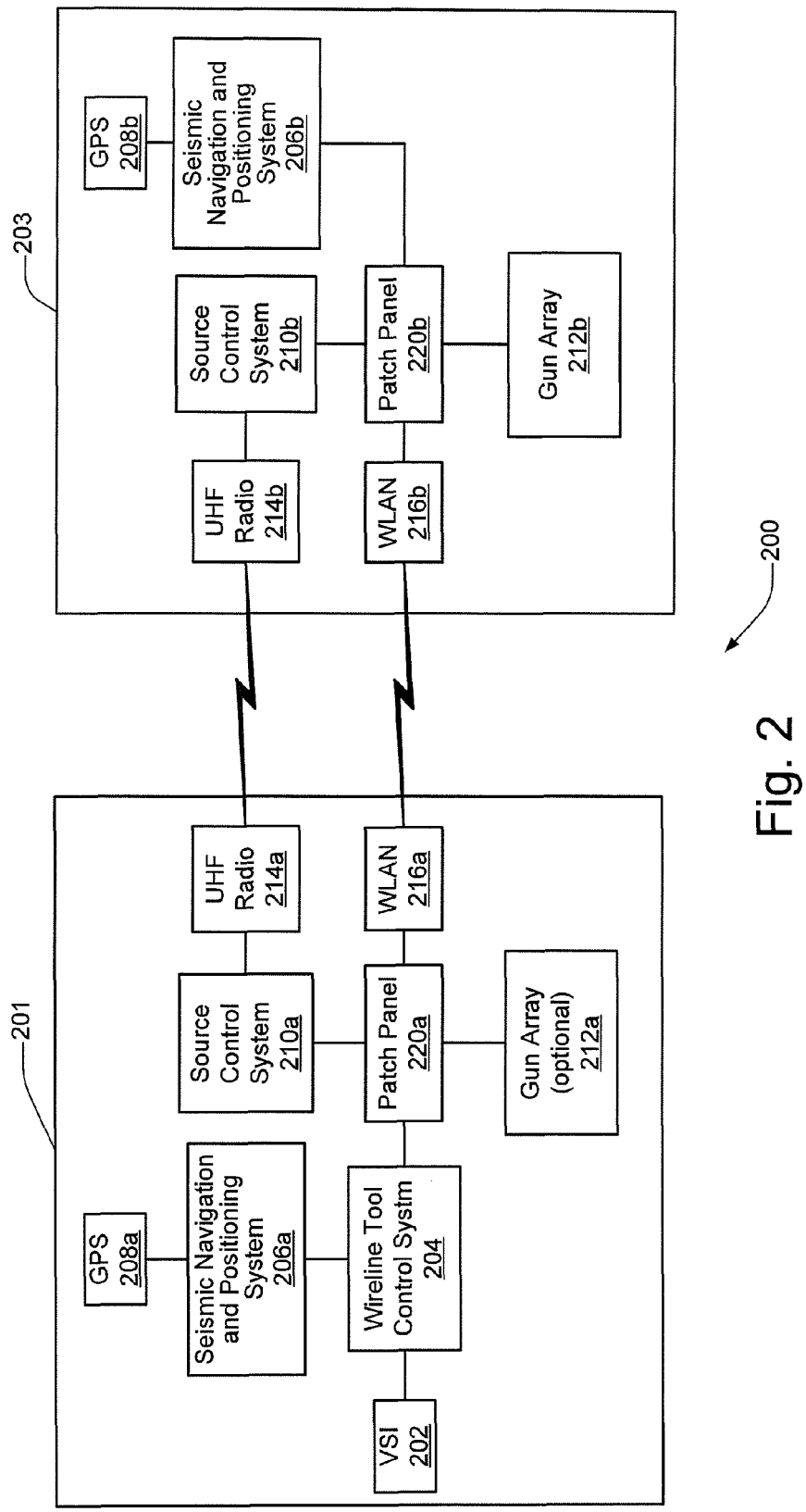
FIG. 2 shows a simplified block diagram of various components, systems, and/or devices which may be used for performing offset seismic surveying operations in accordance with the specific embodiment of the present invention.

FIG. 2 shows a simplified block diagram of various components, systems, and/or devices which may be used for performing offset seismic surveying operations in accordance with the specific embodiment of the present invention. According to a specific embodiment, block portion 201 may represent seismic survey equipment deployed at the offshore rig 100 (FIG. 1B), and block 203 may represent seismic survey equipment deployed at the boat 122. As illustrated in the example of FIG. 2, block portion 201 may include one or more of the following components: a GPS system 208a, a seismic navigation and positioning system 206a (also referred to as SWINGS), a source control system 210a (e.g., Trisor digital source control system, manufactured by WesternGeco-Fjord Instruments Inc.), a UHF radio 214a, a wire line tool control system 204 (e.g., MAXIS control system available from Schlumberger Technology Corporation), a patch panel system 220a, a wireless LAN transceiver 216a, etc. In specific implementations, block portion 201 may optionally include gun array 212a, and may include at least one versatile seismic imager (VSI) 202, and/or other seismic surveying equipment.

As illustrated in FIG. 2, block portion 203 may include one or more of the following components: a GPS system 208b, a seismic navigation and positioning system 206b, a source control system 210b, a UHF radio 214b, a patch panel system 220b, a wireless LAN transceiver 216b, at least one gun array 212b, etc.

It will be appreciated that alternate embodiments of the present invention (not shown) may include additional components not illustrated in FIG. 2, and/or may omit one or more components which are illustrated in the specific embodiment of FIG. 2.

Figure 3:
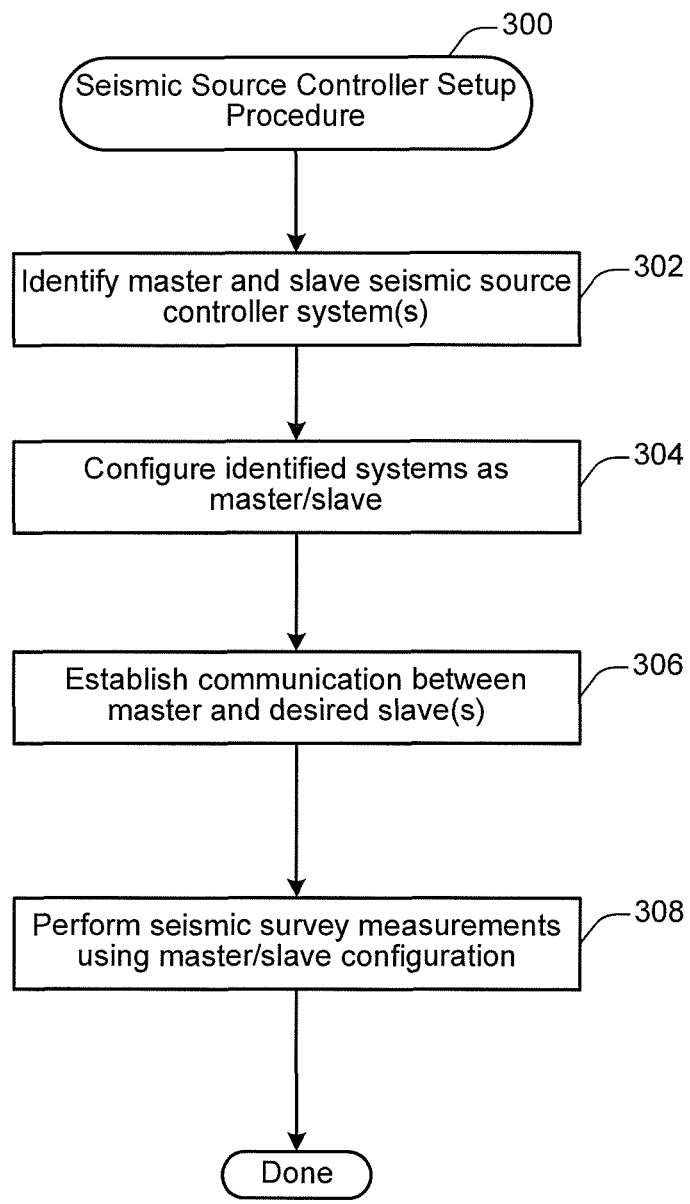
FIG. 3 shows a flow diagram of a Seismic Source Controller Setup Procedure 300 in accordance with the specific embodiment of the present invention.
Figure 5:
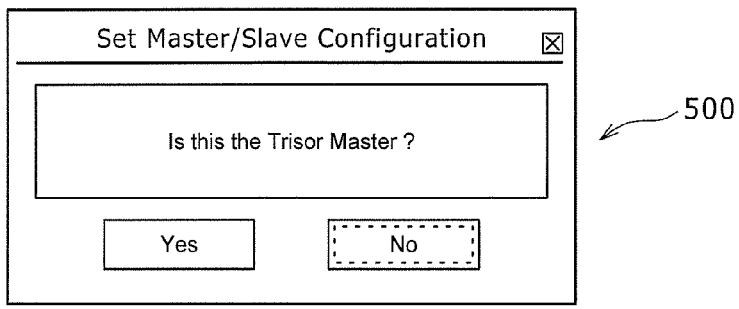
FIG. 5 illustrates a specific embodiment of a Set Master/Slave Configuration dialogue box 500.

FIG. 3 shows a flow diagram of a Seismic Source Controller Setup Procedure 300 in accordance with the specific embodiment of the present invention. According to at least one embodiment, the Seismic Source Controller Setup Procedure 300 may be implemented at the rig-side seismic survey computer system and/or remote-side seismic survey computer system. Initially, as illustrated at 302, the master and slave seismic source controller systems are identified, for example, by a human technician. In at least one embodiment, each source control system 210a, 210b may be initialized as a master or a slave. This is shown for example, in FIG. 5 of the drawings, which illustrates a specific embodiment of a Set Master/Slave Configuration dialogue box 500. According to a specific embodiment, dialogue box 500 may be displayed at each source control system upon startup in order to set master/slave configurations. In one implementation, a system may automatically default to being configured as a slave unless it has been designated as a master.

In a specific implementation, the rig-side source control system 210a may be configured at startup as a master, and the remote-side system 210b may be configured at startup as a slave (304, FIG. 3). Once the appropriate source control systems have been configured as master or slave, communication may then be established 306 between the master and selected slave(s). This is shown, for example, in FIG. 7 of the drawings, which illustrates a specific embodiment of a Slave Connection dialogue box 700. According to a specific implementation, both the master system and the slave system may be configured to be able to initiate communication between each other.

Figure 7:
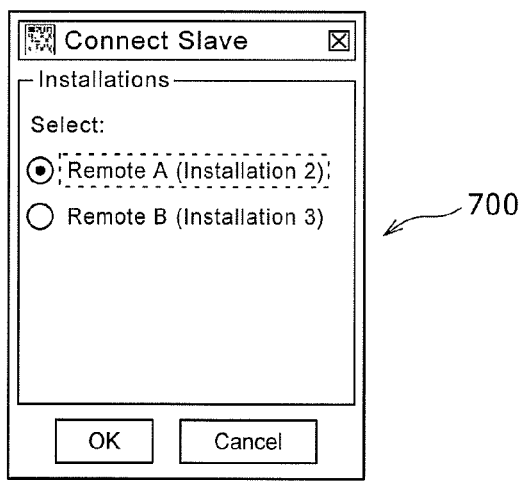
FIG. 7 illustrates a specific embodiment of a Slave Connection dialogue box 700.

As illustrated in the Slave Connection dialogue box of FIG. 7, the master system GUI provides the capability of allowing the master system to connect to one or more desired slave systems (e.g., Remote A slave, Remote B slave, etc.). Once communication between the master and desired slave systems has been established, seismic survey measurements may then be performed (308, FIG. 3) using the master/slave configured systems.

According to a specific embodiment, once the master and a slave are connected, the slave will be fully visible on the master. The master is then able to perform a variety of tasks relating to slave operation and control such as, for example:
   a) Displaying and/or changing the current slave system operating mode.
   b) Plotting and displaying data that is received at the slave system. According to a specific embodiment, the master system may be configured to display QC plots and/or sensor signal readings which may normally be displayed at the slave system. Additionally, the master system may be configured to record the data into a database which is stored at the master system.
   c) Generating slave Tape Header information for wireline tool control system. According to a specific embodiment, the master system may be configured to generate and process, in real-time, QC data received from the slave system, and then send the processed QC data (typically referred to as "Tape Header") to the wireline tool control system in real-time.
   d) Controlling firing the guns.
   e) Changing Gun parameters. According to a specific embodiment, the master system may be configured to remotely change tuning and/or gun parameters at the slave system such as, for example, blanking intervals, manual delay, gun pulse width, pick polarity, filter method, etc.

According to a specific embodiment, the master source control system may be connected directly to the wireline tool control system 204 using, for example, using a LAN connection (e.g., an Ethernet connection). Additionally, the slave source control system may be connected to the seismic navigation and positioning system 206b using, for example, a wired LAN connection.

According to a specific embodiment, data may be collected by components of the remote-side system and saved in a database located at the remote-side system or, alternatively, at the rig-side system. Additionally, in at least one implementation, data may also be collected by components of the rig-side system and stored in a local database such as, for example, a database located at the source control system 210a.

Figure 6:
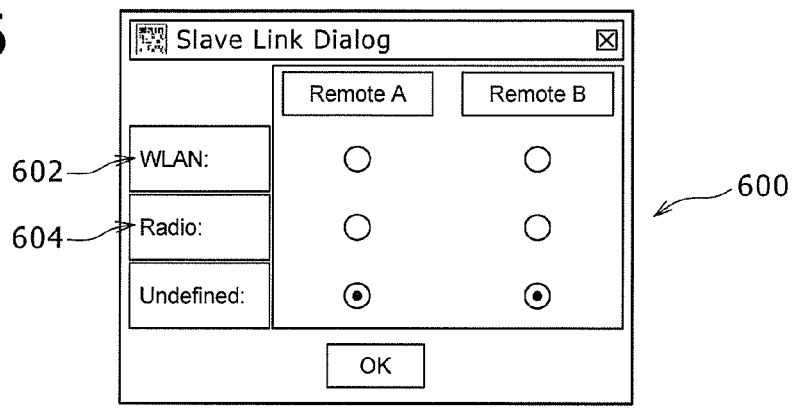
FIG. 6 illustrates a specific embodiment of a Slave Link Communication dialogue box 600.

In at least one implementation where the rig-side source control system 210a is configured as the master and the remote-side source control system 210b is configured as the slave, the source control system slave 210b may be configured or designed to collect and save data in a manner similar to that of the source control system master. Additionally, in at least one embodiment, the slave system(s) may be configured to communicate with the master system via radio modems (e.g., 214a, 214b) and/or wireless LAN transceivers (e.g., 216a, 216b). This is shown, for example, in FIG. 6 of the drawings, which illustrates a specific embodiment of a Slave Link Communication dialogue box 600. In the example of FIG. 6, the master system GUI is configured to provide a user with the ability to select the mode of communication between the master system and each of the slave systems. Thus, for example, using the dialogue box 600, a user may configure the master system to communicate with Remote A slave system via wireless LAN 602, and may configure the master system to communicate with Remote B slave system via radio 604.

Communication via radio modems provides relatively low bandwidth such as, for example, up to 100 kbps. In contrast, communication via wireless LAN transceivers provides relatively high bandwidth such as, for example, up to 54 Mbps. Moreover, unlike conventional techniques which provide for an analog communication link between the rig-side seismic survey system and boat-side seismic survey system, the technique of the present invention provides for a digital communication between the rig-side seismic survey system and boat-side (or remote-side) seismic survey system(s). In this way, digital seismic survey data and digital source control information may be digitally transmitted between the rig-side seismic survey system and desired remote-side seismic survey system(s). As a result, the seismic source control system and GUI of the present invention are able to provide a number of benefits and advantages over conventional seismic source control systems.

For example, the technique of the present invention provides for improved source signal firing timing accuracy. Using conventional techniques, source signal firing timing accuracy generally has an associated tolerance within the order of milliseconds. This is primarily due to the fact that conventional source signal timing synchronization is implemented the between the master and remote signal source(s) using analog radio communication techniques which include an inherent radio delay factor. In contrast, the technique of the present invention may be used to improve the tolerance of timing accuracy and synchronization of the firing of the signal source(s) to within the order of microseconds. According to at least one implementation, the improved source signal timing accuracy of the present invention may be attributable to a combination of factors such as, for example, the use of GPS timing synchronization at the rig-side seismic survey computer system and remote-side seismic survey computer system(s), the use of a digital communication link between the rig-side seismic survey computer system and remote-side seismic survey computer system(s), etc.

Another advantage of the present invention is that a provides for improved quality control information and analysis during seismic survey measurement operations. According to at least one implementation, a Quality Control Window may be used to plot, in real-time, desired data, including real-time data collected during the seismic survey measurement operations. In a specific implementation, the Quality Control Window may include a plurality of different tabs relating to different types of sensors, such as, for example, Near Field Hydrophone (NFH), NFH Frequency, Gun, Current, Overlay, Tuning Error, Gun Delay, Depth, Manifold Pressure, etc. According to a specific embodiment, the Gun tab window may display signals from gun TB (Time Break) sensors for individual guns. The Current tab window may display information relating to gun solenoid currents for individual guns. The Overlay tab window may display, for example, NFH, Gun, and/or Current plots in the same window and time scale in order to facilitate comparison of the timing relationship of these signals. Data which is collected at the rig-side seismic survey computer system and/or data which is transmitted from the remote-side seismic survey computer system may be processed for QC analysis, and plotted. It is also possible to plot information relating to source signal fire control characteristics.

Figure 9:
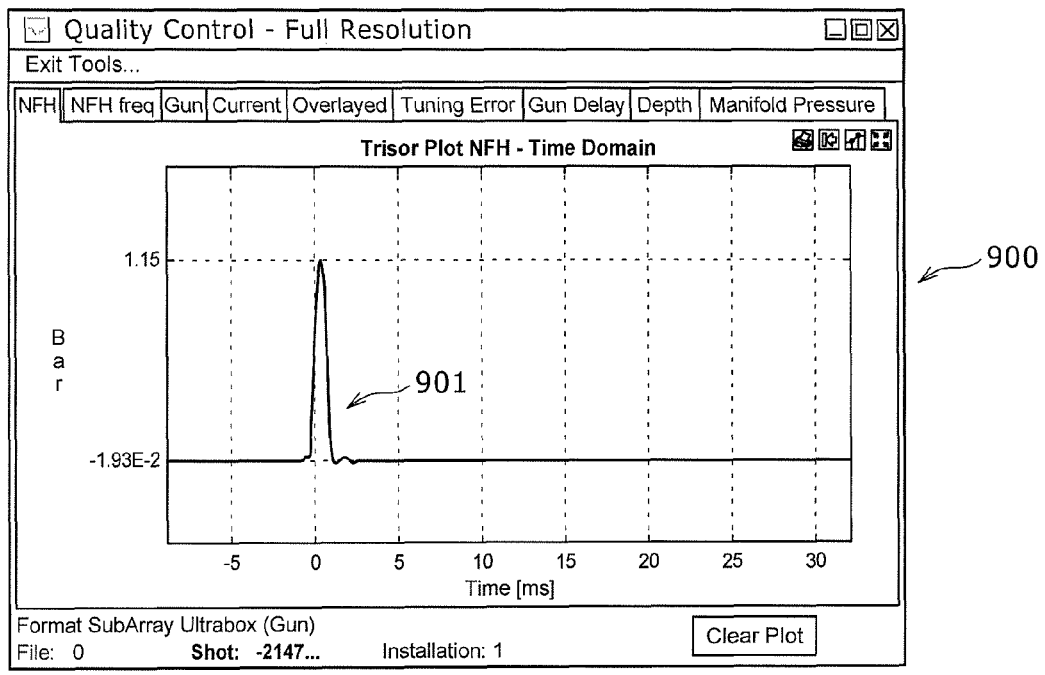
FIGS. 9-12 illustrate examples of various types of quality control information which may be displayed using a specific embodiment of the Quality Control Window of the present invention.
Figure 10:
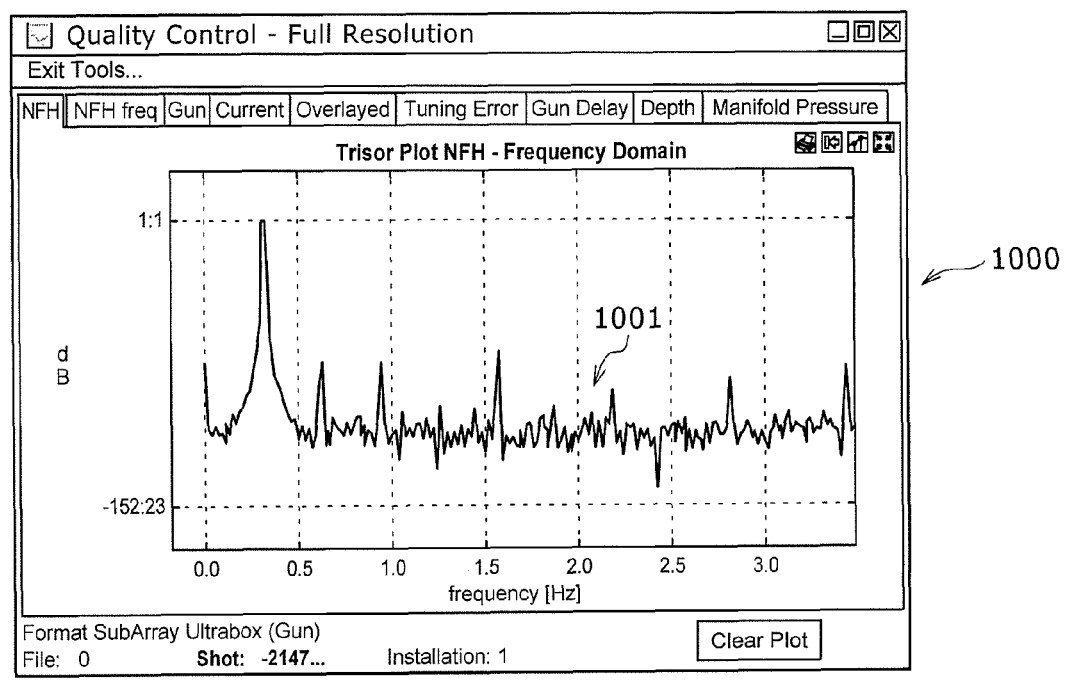
Figure 11:
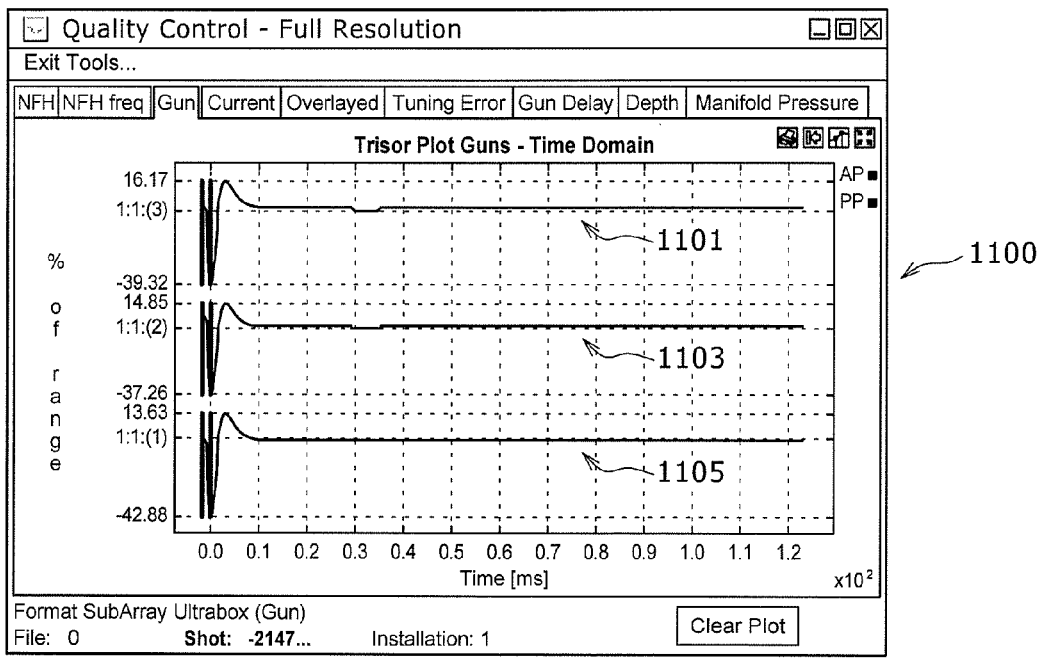
Figure 12:
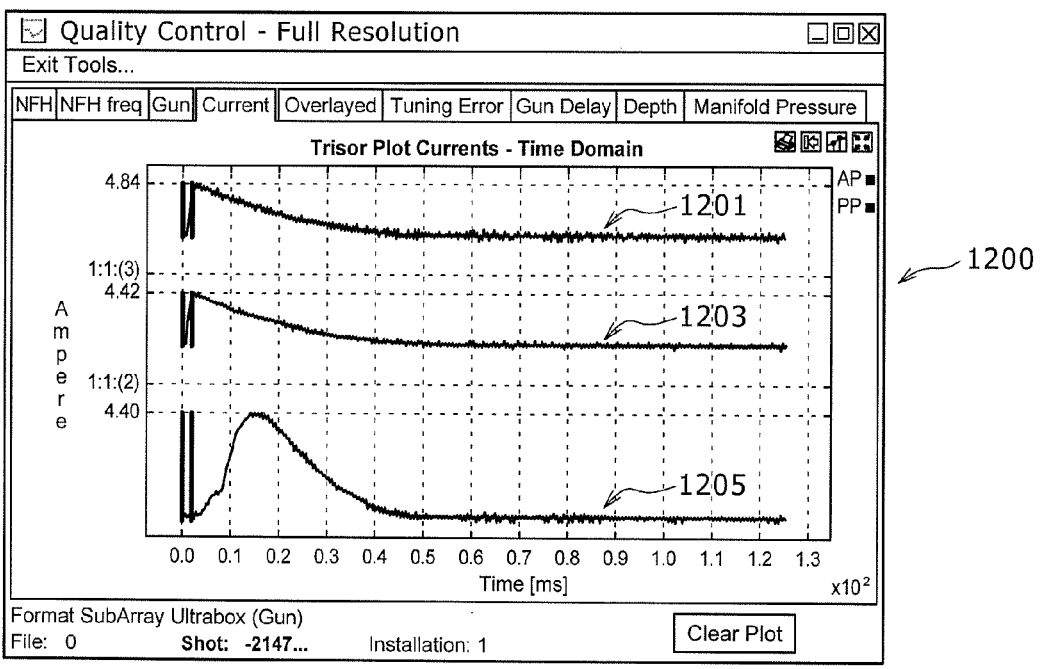

FIGS. 9-12 illustrate examples of various types of quality control information which may be displayed using a specific embodiment of the Quality Control Window of the present invention. For example, FIG. 9 shows a graphical illustration of real-time data relating to the source signal signature, which is displayed, for example, as a function of pressure v. time. FIG. 10 shows a graphical illustration of other real-time data relating to the source signal signature, which is displayed as a function of signal strength v. frequency. FIG. 11 shows a graphical illustration of real-time data relating to source timing signal device characteristics (e.g., air gun time break sensor signals, etc.) for selected guns, which is displayed, for example, as a function of normalized electrical voltage (%) v. time. FIG. 12 shows a graphical illustration of real-time data relating to other source signal device characteristics (e.g., air gun solenoid current characteristics, etc.) for selected guns, which is displayed as a function of electrical current v. time.

It will be appreciated that the present invention allows for various types of information to be analyzed and displayed for quality control analysis, including real-time data collected during the seismic survey measurement operations. Moreover, unlike conventional techniques, the technique of the present invention is able to provide improved quality control analysis functionality by providing high resolution displays of real-time QC data. Such high resolution displays of real-time QC data has traditionally been unavailable to conventional offset seismic survey systems. One reason for this is due to the fact that conventional offset seismic survey systems utilized a low bandwidth analog radio communication link to communicate between the rig-side seismic survey system and boat-side seismic survey system. However, as described previously, specific embodiments of the seismic survey systems of the present invention are able to be configured or designed to utilize a high bandwidth digital communication link to communicate between the rig-side seismic survey system and the remote-side seismic survey system. The use of a high bandwidth digital communication link between the rig-side seismic survey system and the remote-side seismic survey system allows for improved quality control analysis functionality, for example, by enabling high bandwidth communication of seismic survey measurement information, signal source information, and/or other QC information between the rig-side seismic survey system and the remote-side seismic survey system, which, in turn, allows for high resolution real-time QC information (such as that shown, for example, in FIGS. 9-12 of the drawings) to be displayed to the user.

In addition, the use of a high bandwidth digital communication link between the seismic survey computer systems of the present invention allows for shorter cycle time between seismic survey measurements. For example, the average cycle time for conventional offset seismic survey systems is about 10-15 seconds. In contrast, the average cycle time for offset seismic survey systems of the present invention is up to about 5 seconds.

Another advantageous feature which the seismic survey system of the present invention provides over conventional seismic survey systems is the ability to remotely monitor, control and modify desired parameters at the remote-side seismic survey system, particularly in response to QC analysis of previous seismic survey measurements.

Figure 4:
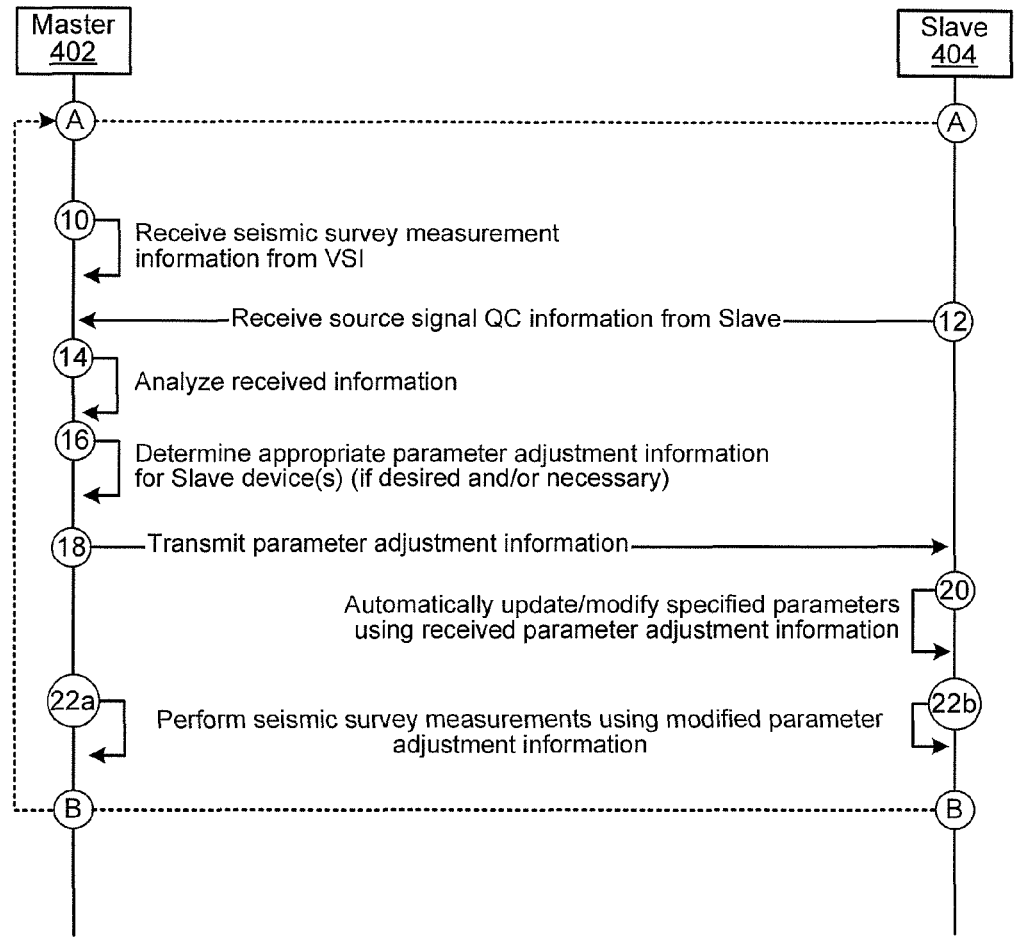
FIG. 4 shows an example of a flow diagram 400 illustrating a specific embodiment of how various information may be used to determine and dynamically modify desired parameters at a remote-side seismic survey system.

FIG. 4 shows an example of a flow diagram 400 illustrating a specific embodiment of how various information may be used to determine and dynamically modify desired parameters at a remote-side seismic survey system. Initially, in this example, it is assumed that at least one seismic survey measurement has been performed using the seismic survey equipment illustrated in FIG. 1B. As shown in FIG. 4, seismic survey measurement information (such as that recorded by receivers 103) is received (10) at the Wireline Tool Control System (204, FIG. 2) which is connected to the master seismic survey computer system 402. Additionally, source signal quality control information is transmitted (12) from the slave seismic survey system 404 to the master 402. At least a portion of the received information is then analyzed (14) using one or more of the above-described quality control analysis techniques and/or other quality control analysis techniques commonly known to one having ordinary skill in the art. In at least one embodiment, the QC analysis of the received information may be used to determine (16) desired parameter adjustment information relating to one or more of the devices associated with the slave seismic survey system. According to one embodiment, a human technician may utilize the analyzed QC information in order to generate desired parameter adjustment values for the slave system. In an alternate embodiment, at least a portion of the parameter adjustment values may be automatically generated and/or recommended by hardware and/or software components associated with the master system. Examples of different parameters of the slave system which may be remotely modified via the master system are illustrated in FIGS. 13-19 of the drawings.

Once the appropriate slave system parameter adjustment information has been determined, the parameter adjustment information is transmitted (18) to the slave system. Using the received parameter adjustment information, the slave system 404 may then automatically update and/or modify (20) appropriate parameter values at the slave system. According to a specific embodiment, the updating or modification of the parameter values at the slave seismic survey system may be performed in real-time and without the need for a human operator or technician to implement the parameter value modifications at the slave system. Additional seismic survey measurements may then be performed using the modified slave system parameter values. At least a portion of the measured data obtained during the additional seismic survey operations may then be transmitted to the master system 402 in order, for example, to perform additional QC analysis and/or parameter adjustments.

According to at least one implementation, the GUI of the present invention may include a Fire Control Window for facilitating remote parameter adjustment of the slave system. In one implementation, the Fire Control Window may be configured or designed to allow a user to perform various functions including, for example, loading desired configuration files and displaying visual models of the configuration parameters; remotely selecting the operating mode of the slave system (such as, for example, Control System Mode, Safe Mode, Test Mode, Offline Mode, Online Mode, etc.); remotely preparing, testing and/or controlling the slave system; displaying real-time data from the slave system sensors; etc. According to a specific embodiment, the configuration files may be implemented as files which model the remote-side hardware configuration(s) which, for example, may include information relating to settings, parameters and/or other information required for operating the source control system(s).

Figure 20:
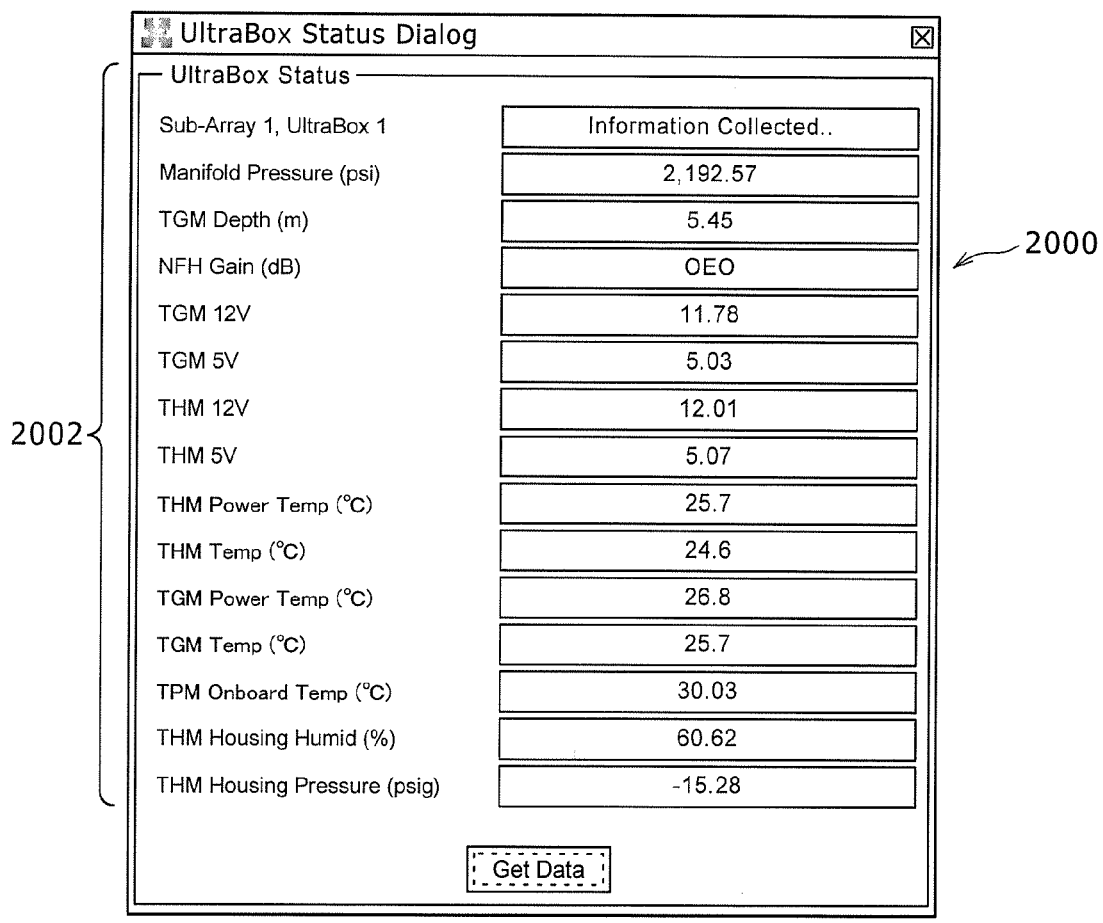
FIG. 20 shows a specific embodiment of a GUI 2000 which may be used for displaying various status information associated with the slave seismic survey system.

In a specific implementation, the Fire Control Window may be configured or designed to provide a variety of different pull-down menus which may be used to provide additional functionality. For example, a View menu may be used to select desired status information to be displayed to the user, for example, via the Fire Control Window GUI. Such information may include, for example, signal source device information (e.g., gun information), sensor information (e.g., NFH sensors, depth sensors, manifold sensors, etc.), communication information (e.g., fire pulse channel information), etc. An example of different types of status information which may be displayed his illustrated in FIG. 20 of the drawings. FIG. 20 shows a specific embodiment of a GUI 2000 which may be used for displaying various status information associated with the slave seismic survey system. At least one embodiment, the information displayed in FIG. 20 represents real-time information which may be obtained from the slave system and displayed in real-time on the master system.

FIGS. 13-19 illustrate specific embodiments of various GUIs of the present invention which may be used to enable a user of a master seismic survey system to remotely modify parameters associated with one or more slave seismic survey systems. Each of these figures will now be discussed in brief detail in order to describe at least some of the various parameters of the slave system which may be remotely modified using the technique of the present invention.

Figure 13:
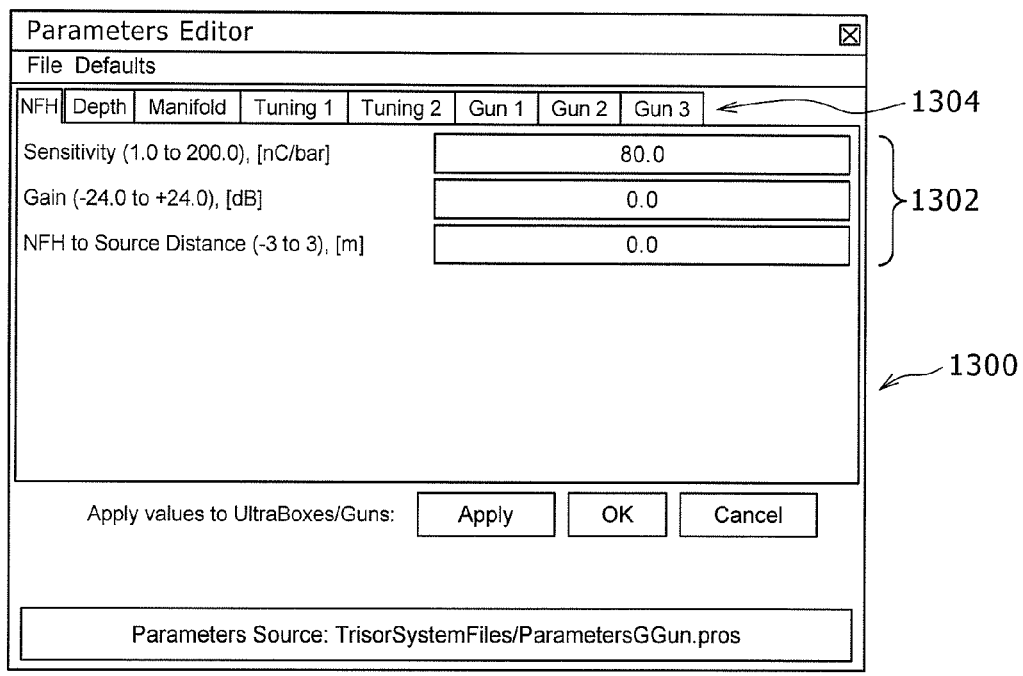
FIGS. 13-19 illustrate specific embodiments of various GUIs of the present invention which may be used to enable a user of a master seismic survey system to remotely modify parameters associated with one or more slave seismic survey systems.

FIG. 13 shows a specific embodiment of a GUI 1300 which may be used for remotely modifying NFH parameters such as, for example, sensitivity, gain, distance from NFH to signal source, etc.

Figure 14:
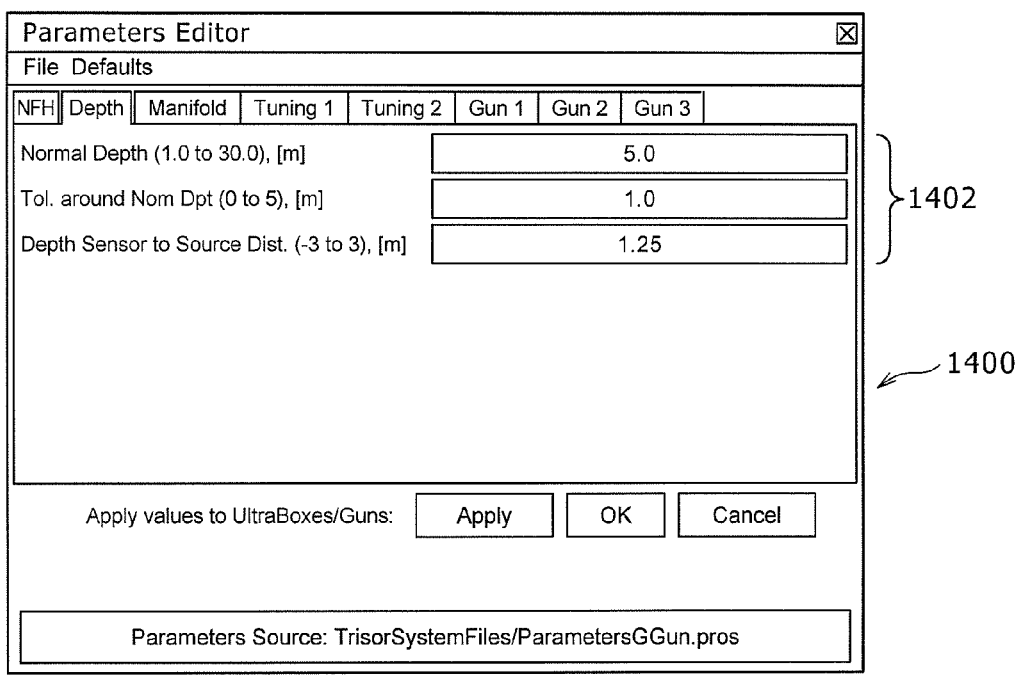

FIG. 14 shows a specific embodiment of a GUI 1400 which may be used for remotely modifying source depth sensor parameters such as, for example, nominal depth, tolerance around nominal depth, distance from depth sensor to signal source, etc.

Figure 15:
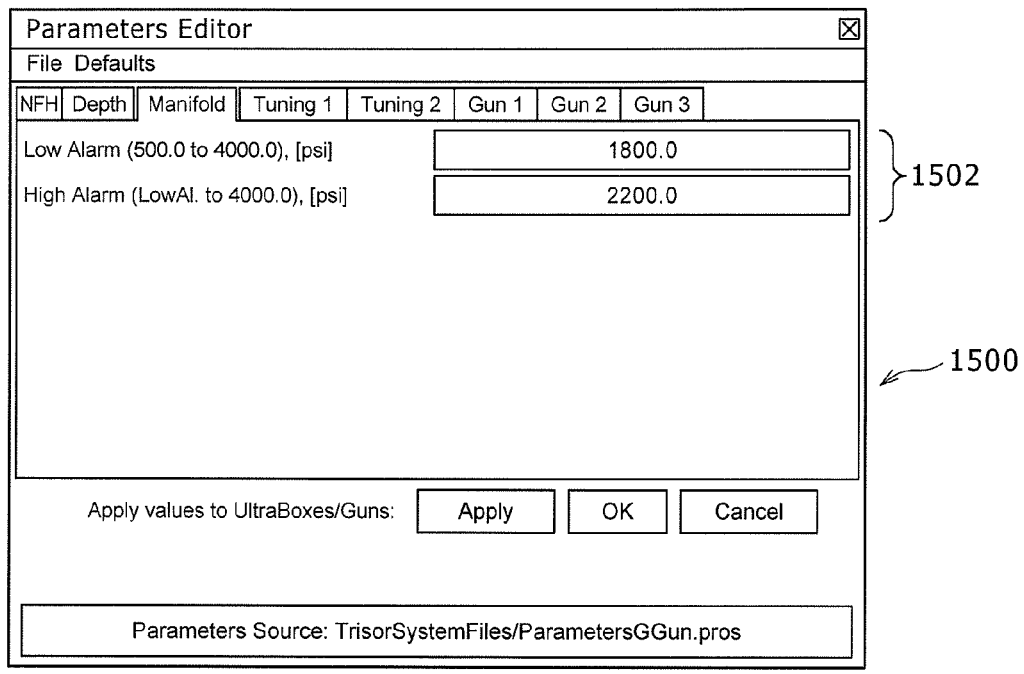

FIG. 15 shows a specific embodiment of a GUI 1500 which may be used for remotely modifying manifold sensor parameters such as, for example, low pressure alarm, high pressure alarm, etc.

Figure 16:
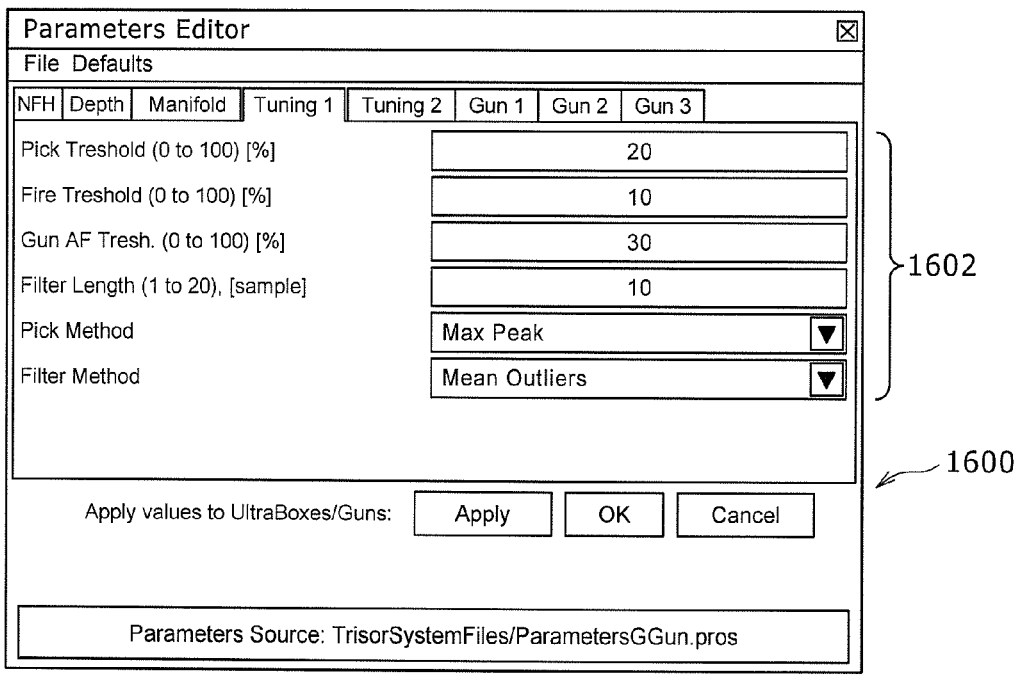

FIG. 16 shows a specific embodiment of a GUI 1600 which may be used for remotely modifying source signal tuning parameters such as, for example, pick threshold, fire threshold, gun AF (Auto Fire) threshold, filter length, pick method, filter method, etc.

Figure 17:
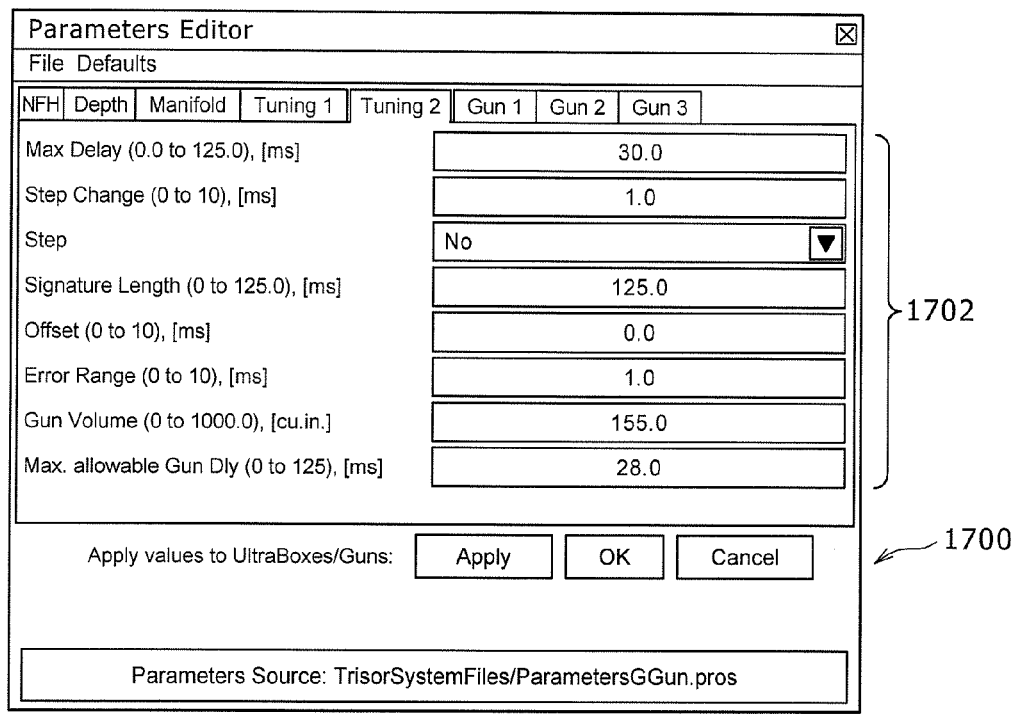

FIG. 17 shows a specific embodiment of a GUI 1700 which may be used for remotely modifying additional source signal tuning parameters such as, for example, max delay, step change, step toggle, signature length, offset, error range, gun volume, max allowable gun delay, etc.

Figure 18:
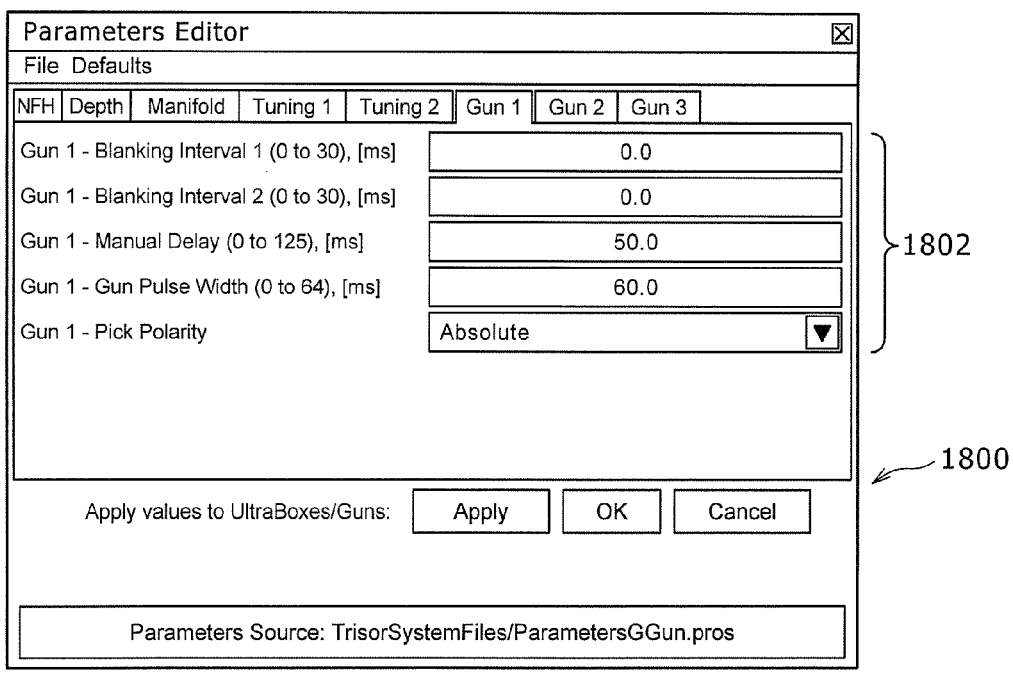

FIG. 18 shows a specific embodiment of a GUI 1800 which may be used for remotely modifying selected source signal device (e.g., gun) parameters such as, for example, blanking interval, manual delay, gun pulse width, pick polarity, etc.

Figure 19:
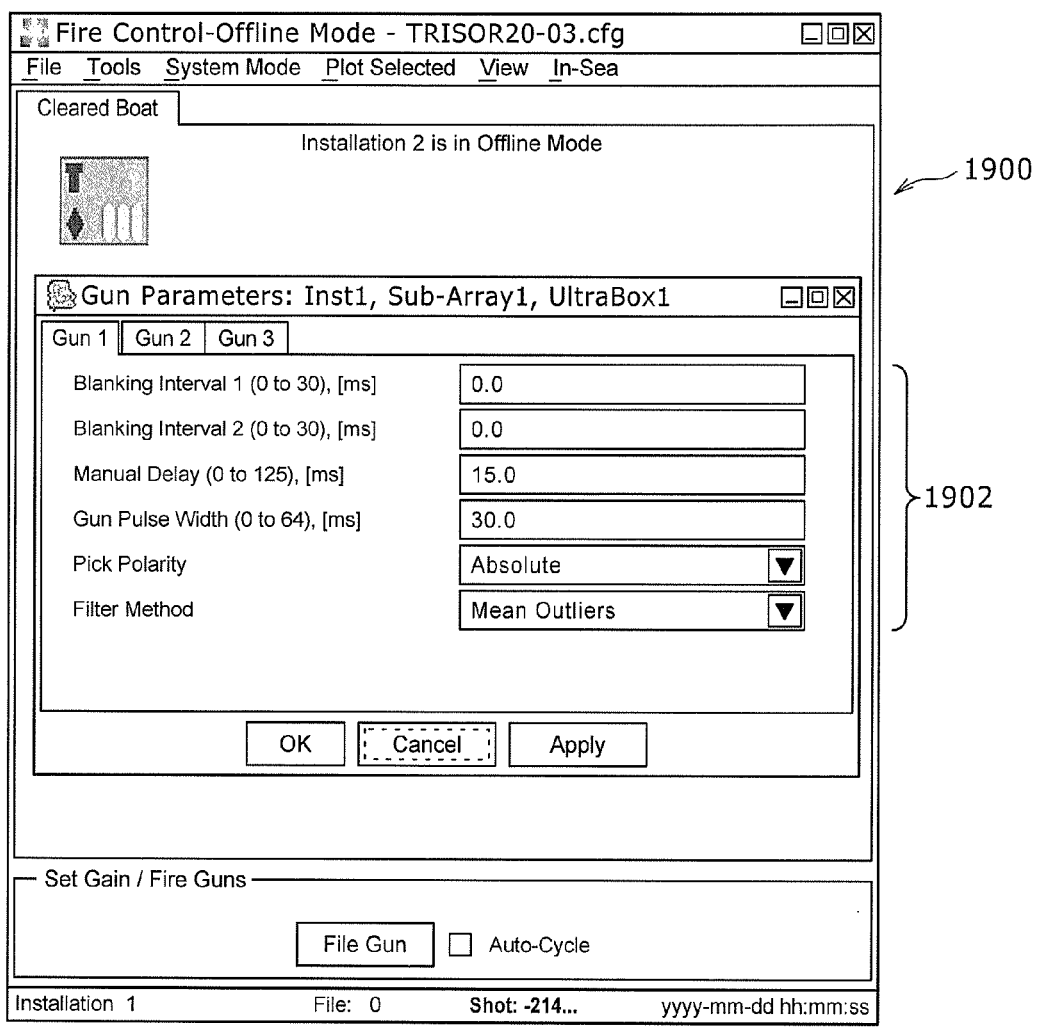

FIG. 19 shows a specific embodiment of a GUI 1900 which may be used for remotely implementing manual tuning of source signal device (e.g., gun) parameters such as, for example, blanking interval, manual delay, gun pulse width, polarity selection, filter method, etc. According to one embodiment, the parameter values for the manual tuning of the source signal device may be manually entered into the appropriate boxes of the manual tuning GUI 1900. Alternatively, in at least one embodiment, computer implemented software and/or hardware may be used to automatically suggest parameter values for the manual tuning of the source signal device. For example, in one implementation, when a user at the master system attempts to perform manual tuning of a gun located at the boat-side system, a dialog box may be designed to pop up and suggest at least one preferred value for the parameter to be adjusted. The user may then choose to reject the suggested value(s), or, alternatively may choose to accept the suggested value. This feature of providing computer implemented suggestions of desired values is advantageous in that it facilitates manual tuning of source signal devices even in situations, for example, where there are source time break sensor device failures. In a specific implementation, the suggested values may correspond to preferred default values, previously known actual working values, etc.

The following example is intended to help illustrate of various aspects of the present invention may be used to overcome problems encountered during offset seismic survey measurement operations. In this example, it is assumed that a seismic engineer stationed at the rig (100, FIG. 1B) is monitoring the display of QC analysis information at the rig-side seismic survey computer system. Further, it is assumed that the wireline tool control system reports detection of the occurrence of a gun tuning error for Gun#1 which is associated with the boat-side seismic survey system. In this example, there is a high degree of noise on the sensor signal for Gun#1. In order to reduce or eliminate such noise, the engineer may use the master system to access the slave system in order to change the operating mode at the slave system to Safe mode, and then use the Fire Control Window GUI to change the blanking interval parameters for Gun#1. Thereafter, the engineer may switch the operating mode of the slave system to Offline mode, and then manual fire Gun#1 in order to determine whether the noise condition has improved. Once the tuning error (e.g., noise condition on Gun#1) has satisfactorily improved, the engineer may then switch the operating mode of the slave system to Online mode, and then continue with subsequent seismic survey measurement operations.

Figure 8:
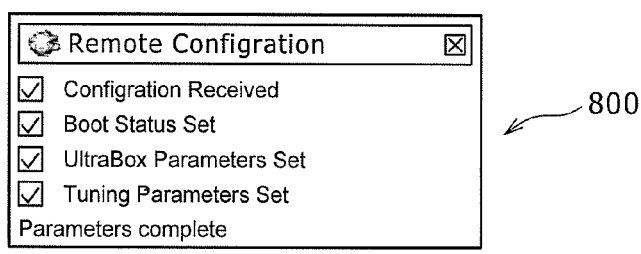
FIG. 8 shows an example of a Remote Configuration Dialog Window 800.

According to a specific embodiment, a System Configuration Window may be provided for enabling a user at the master system to create and transmit configuration files and/or parameter adjustment information for use at the slave system. During the transfer of the configuration files and/or parameter adjustment information from the master system to the slave system, a separate Remote Configuration Dialog Window may be displayed for monitoring the status or progress of the master/slave synchronization. An example of a Remote Configuration Dialog Window is illustrated in FIG. 8 of the drawings. As illustrated in the example of FIG. 8, checkboxes in the Remote Configuration Dialog Window may be automatically checked upon the completion of specific tasks. In this way, the user may be notified, in real-time, of the current status of the master/slave synchronization. In at least one embodiment, an Error Window may be provided for displaying error messages and/or status messages reported by the TPMs (Trisor Processor Modules) and/or other hardware/software in the seismic survey systems.

According to a specific embodiment, the method of communication between the master source control system and the slave source control system may be controlled from either the master or slave from the Main Window of the GUI. In at least one implementation, the Main Window of the GUI may be configured as the main application in the source control system. This application may store desired data and communicates with the local and remote database(s). It may also communicate with the remote-side systems and other GUI applications.

Additional techniques relating to source control for borehole seismic survey systems are described in commonly assigned, co-pending U.S. patent application Ser. No. 10/439,904, entitled "Methods And Apparatus Of Source Control For Borehole Seismic", filed on May 16, 2003, naming Tulett et. al. as inventors. That application is incorporated herein by reference in its entirety for all purposes.

OTHER EMBODIMENTS

Generally, the remote source signal and seismic survey system control techniques of the present invention may be implemented on software and/or hardware. For example, they can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system. In one implementation, the GUI of the present invention may be implemented using JAVA-based software applications.

A software or software/hardware hybrid implementation of the remote source signal and seismic survey system control techniques of this invention may be implemented on a general-purpose programmable machine selectively activated or reconfigured by a computer program stored in memory. Such programmable machine may be implemented on a general-purpose network host machine such as a personal computer or workstation. Further, the invention may be at least partially implemented on a card (e.g., an interface card) for a network device or a general-purpose computing device.

Figure 21:
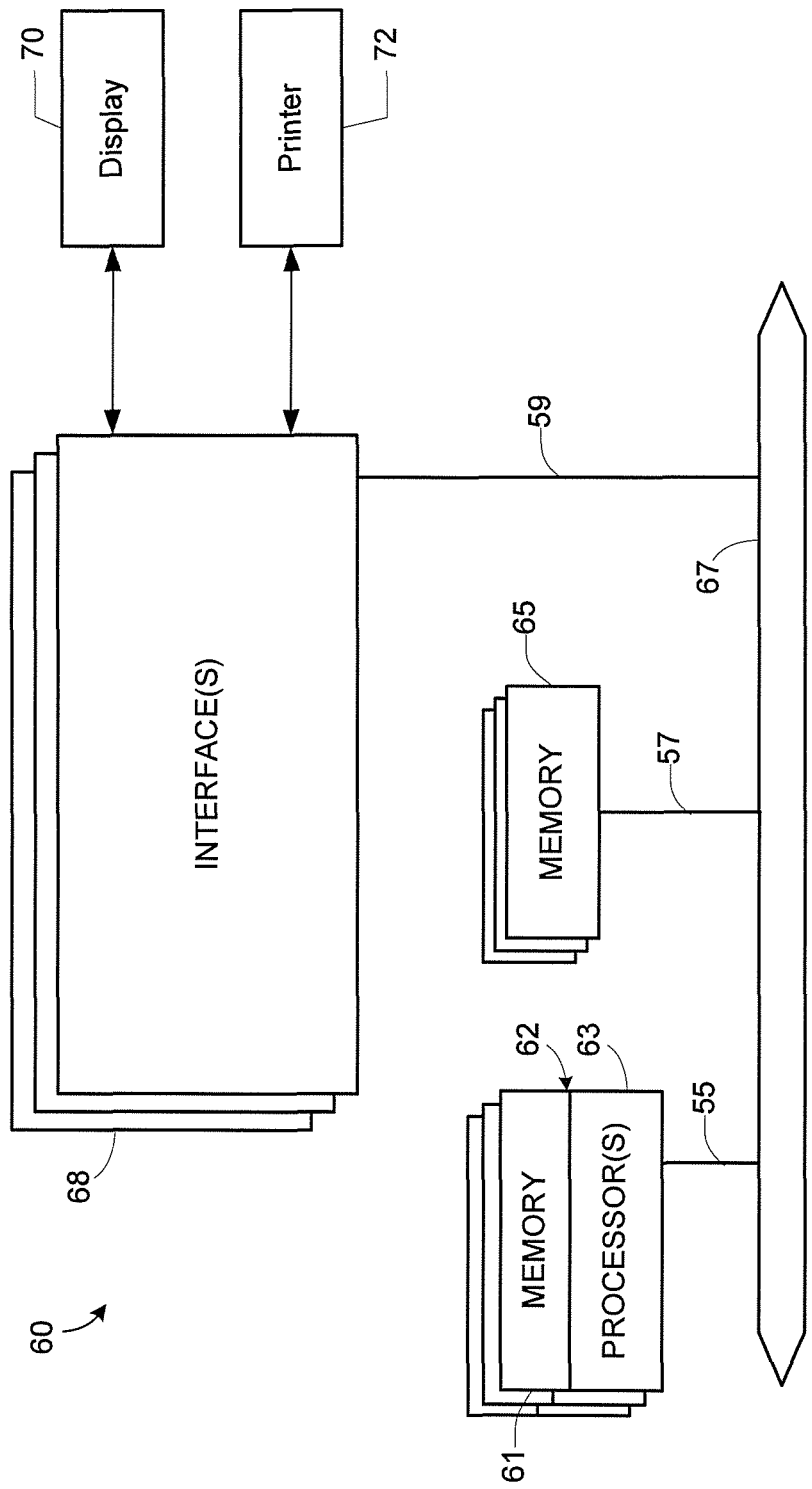
FIG. 21 shows a network device 60 suitable for implementing various aspects of the present invention.

Referring now to FIG. 21, a network device 60 suitable for implementing various aspects of the remote source signal and seismic survey system control techniques of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a general-purpose computing device, the CPU 62 may be responsible for data processing, media management, I/O communication, calculating the geophone response parameter values, performing geophone response compensation operations, etc. The CPU 62 preferably accomplishes all these functions under the control of software including an operating system (e.g. Windows NT), and any appropriate applications software.

CPU 62 may include one or more processors 63 such as a processor from the Motorola or Intel family of microprocessors, or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60, such as, for example, display devices 70 and/or printing devices 72. It will be appreciated that the various remote source signal and seismic survey system control techniques of the present invention may generate data or other information to be presented for display on electronic display devices and/or non-electronic display devices (such as, for example, printed for display on paper).

Examples of other types of interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may be used, for example, to handle data processing tasks, display tasks, communication tasks, media control tasks, etc.

Although the system shown in FIG. 21 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the remote source signal and seismic survey system control techniques described herein. The program instructions may control the operation of an operating system and/or one or more applications, for example. The memory or memories may also be configured to store data structures, seismic logging information, geophone response parameter information, vibroseis prospecting information, and/or other specific non-program information described herein.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although several preferred embodiments of this invention have been described in detail herein with reference to the accompanying drawings, it is to be understood that the invention is not limited to these precise embodiments, and that various changes and modifications may be effected therein by one skilled in the art without departing from the scope of spirit of the invention as defined in the appended claims.

It is claimed:

1. A seismic survey system for performing offset borehole seismic survey measurement operations, comprising:
   a first seismic survey subsystem for surface seismic survey; and
   a second seismic survey subsystem for borehole seismic survey wherein the second seismic survey subsystem is remotely located from the first seismic survey subsystem;
   at least one source signal device;
   the first seismic survey subsystem comprises:
      a first source control system controlling the at least one source signal device to perform a surface seismic survey;
      a first interface; and
      a first wireless digital communication device;

the second seismic survey subsystem comprises:
    a second source control system controlling the at least one source signal device to perform a borehole seismic survey distinct from the surface seismic survey;
    a second interface; and
    a second wireless digital communication device;
wherein the first and second digital communication devices are configured or designed to provide a digital communication link for transporting digital information between the first seismic survey subsystem and second seismic survey subsystem.

2. The system of claim 1, wherein the bandwidth of the digital communication link is at least 10 Mbps.

3. The system of claim 1, wherein the at least one source signal device has a first plurality of operating parameters associated therewith;
    the system being configured or designed to enable a user at the first seismic survey subsystem to remotely control or modify at least a portion of the first plurality of operating parameters.

4. The system of claim 1, wherein the at least one source signal device includes a first air gun;
    the system being configured or designed to enable a user at the first seismic survey subsystem to remotely implement manual tuning of operating parameters associated with the first air gun.

5. The system of claim 4, wherein the system is further configured or designed to automatically provide suggested operating parameter values to the user for facilitating manual tuning of the first air gun operating parameters.

6. The system of claim 1, wherein the first seismic survey subsystem includes a first GPS device;
    wherein the second seismic survey subsystem includes a second GPS device; and
    wherein the system is configured or designed to utilize the first and second GPS devices to improve accuracy of source signal firing timing synchronization within a range of about 1-10 microseconds.

7. A system for using a second seismic survey subsystem to remotely control desired aspects of a first remote seismic survey subsystem, wherein the first seismic survey subsystem includes at least one first seismic source signal device, the at least one first source signal device having a first plurality of operating parameters associated therewith, comprising:
    a first seismic survey subsystem for a surface seismic survey; and
    a second seismic survey subsystem for a borehole seismic survey remotely located from the first seismic survey subsystem, wherein the first seismic survey subsystem and the second seismic survey subsystem control the first seismic source signal device to perform the surface seismic survey and the borehole seismic survey respectively;
    the first seismic survey subsystem comprises:
        a first processor;
        a first interface;
        first memory;
    the second seismic survey subsystem comprises:
        a second processor;
        a second interface;
        second memory;
    the second seismic survey subsystem being configured or designed to display a source signal device parameter interface configured or designed to facilitate remote modification of at least a portion of the first plurality of operating parameters associated with the first source signal device; and
    the second seismic survey subsystem being further configured or designed to modify selected operating parameter values associated with the first source signal device using the source signal device parameter interface.

8. The system of claim 7:
the first seismic survey subsystem being further configured or designed to transmit the modified selected operating parameter values from the first seismic survey subsystem to the second seismic survey subsystem; and
the second seismic survey subsystem being configured or designed to automatically implement modification of the selected operating parameter values associated with the first source signal device using the received modified selected operating parameter values.

9. The system of claim 7, wherein the first seismic survey subsystem and second seismic survey subsystem are configured or designed to communicate with each other using a digital communication link.

10. The system of claim 7, wherein the first plurality of operating parameters includes source signal tuning parameters.

11. The system of claim 7, wherein the first source signal device is an air gun.

12. The system of claim 7 being configured or designed to performing offset borehole seismic survey measurements using the first seismic survey subsystem and the second seismic survey subsystem.

13. The system of claim 7 being configured or designed to enable the first seismic survey subsystem to remotely modify (1) a blanking interval parameter value associated with the first source signal device; (2) a manual delay parameter value associated with the first source signal device; (3) a gun pulse width parameter value associated with the first source signal device; (4) a polarity selection parameter value associated with the first source signal device; and/or (5) a filter method parameter value associated with the first source signal device.

14. A system for performing offset borehole seismic survey measurement operations using a first seismic survey subsystem and a second seismic survey subsystem, wherein the first seismic survey subsystem includes at least one first seismic source signal device, the at least one first source signal device having a first plurality of operating parameters associated therewith, comprising:
    a first seismic survey subsystem for surface seismic survey; and
    a second seismic survey subsystem for a borehole seismic survey remotely located from the first seismic survey subsystem, wherein the first seismic survey subsystem and the second seismic survey subsystem control the at least one first seismic source signal device to perform the surface seismic survey and the borehole seismic survey respectively;
    the first seismic survey subsystem comprises:
        a first processor;
        a first interface;
        first memory;
    the second seismic survey subsystem comprises:
        a second processor;
        a second interface;
        second memory;
    the system being configured or designed to perform a first seismic survey measurement operation, wherein the first seismic survey measurement operation generates a first portion of quality control information;

the system being further configured or designed to analyze the first portion of quality control information at the second seismic survey subsystem;

the system being further configured or designed to generate modified operating parameter information in response to the analysis of the first portion of quality control information, wherein the modified operating parameter information relates to at least one operating parameter associated with the first source signal device; and the system being further configured or designed to remotely modify at least one operating parameter associated with the first source signal device using at least one interface at the second seismic survey subsystem.

15. The system of claim 14, wherein the first portion of quality control information includes a first subset of quality control information generated at the second seismic survey subsystem; and wherein the system further comprises transmitting the first subset of quality control information from the second seismic survey subsystem to the first seismic survey subsystem using a digital communication link.

16. The system of claim 14 being further configured or designed to:

transmit the modified operating parameter information from the first seismic survey subsystem to the second seismic survey subsystem; and automatically implement at the second seismic survey subsystem, using the received modified operating parameter information, modification of selected operating parameter values associated with the first source signal device.

17. The system of claim 14, wherein the first seismic survey subsystem and second seismic survey subsystem are configured or designed to communicate with each other using a digital communication link.

18. The system of claim 14 being further configured or designed to perform offset borehole seismic survey measurements using the first seismic survey subsystem and the second seismic survey subsystem.

19. The system of claim 14 being further configured or designed to enable the first seismic survey subsystem to remotely modify (1) a blanking interval parameter value associated with the first source signal device; (2) a manual delay parameter value associated with the first source signal device; (3) a gun pulse width parameter value associated with the first source signal device; (4) a polarity selection parameter value associated with the first source signal device; and/or (5) a filter method parameter value associated with the first source signal device.

20. The system of claim 14, wherein the first source signal device is an air gun.

* * * * *